Patented Feb. 9, 1937

2,070,207

UNITED STATES PATENT OFFICE 2,070,207

NEW CONDENSATION PRODUCTS AND A PROCESS FOR PREPARING SAME

Johann Huismann and Hugo Schweitzer, Wiesdorf, near Cologne-on-the-Rhine, Germany, assignors to I. G. Farbenindustrie Aktiengesellschaft, Frankfort-on-the-Main, Germany, a corporation of Germany No Drawing. Application March 26, 1930, Serial No. 439,217. In Germany March 30, 1929

7 Claims. (Cl. 260—129)

The present invention relates to new condensation products and to a process for preparing same; more particularly it relates to compounds of the probable general formula:—

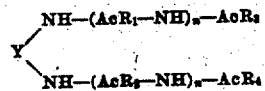

wherein Y stands for an aromatic radical, such as for instance, of the benzene, naphthalene or diphenyl series, in which latter the benzene nuclei may also be linked with each other by means of a bridge, for example, for the grouping—$C_6H_4CH=CHC_6H_4$—, —$C_6H_4$—O—$C_6H_4$—, the above mentioned nuclei being substituted by a sulfonic acid group, "Ac" stands for $SO_2$ or CO, "$R_1$" and "$R_2$" stand for aromatic nuclei of the benzene series having the Ac and NH groups attached to them in meta position to each other and "$R_3$" and "$R_4$" stand for aromatic nuclei of the benzene or naphthalene series, said nuclei $R_3$ and $R_4$ being substituted in meta-position to the amide groups by a substituent of the group consisting of halogen and said sulfonic amide or carboxylic amide groups, $n$ being 0, 1 or 2 and each group being attached to the preceding aromatic nucleus through the nitrogen atom of the amide group. All nuclei may be further substituted by chlorine or methyl groups.

The new condensation products are obtainable by combining an aromatic sulfonic acid halide or carboxylic acid halide with an aromatic diamine to form a water soluble sulfonic acid amide- or carboxylic acid amide-derivative. If the aromatic sulfonic acid halide or the carboxylic acid halide contains a nitro group the same may be reduced to form an amino group and the condensation may be repeated with an aromatic acid halide. The reaction may be carried out in water in the presence of an agent capable of neutralizing the hydrogen halide formed.

The new condensation products obtainable according to the new process are generally colorless or nearly colorless, water-soluble powders, and constitute valuable agents for reserving animal fibers, such as wool or silk and the like, against substantive dyestuffs.

The invention is illustrated by the following examples, without being limited thereto:—

Example 1.—188 parts by weight of 1.3-phenylenediamine-4-sulfonic acid are dissolved in about 20 times the weight of water with the addition of sodium carbonate while maintaining the liquor at a weakly alkaline reaction. 150 parts by weight of chalk are added and then, while thoroughly stirring, at about 70° C. 460 parts by weight of 2.5-dichlorobenzoyl chloride (110% of the theoretical amount). The reaction temperature rises gradually to about 80° C. and the reaction product begins to separate in thick granular masses. It is advantageous to dilute the paste obtained by the addition of hot water. The mixture is gradually heated up to about 100° C., while thoroughly stirring, at which temperature the reaction mixture is maintained for several hours. After cooling, the paste is filtered and stirred with hydrochloric acid until distinctly acid to Congo red. The crude product, after filtering and washing with cold water is redissolved from hot water and rendered alkaline by the addition of sodium carbonate. There crystallizes in satisfactory yield the sodium salt of the bis-(2'.5'-dichlorobenzoyl)-1.3-phenylenediamine-4-sulfonic acid:

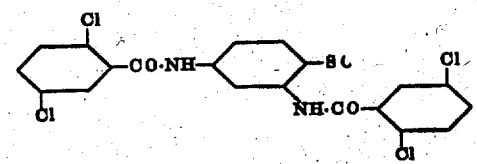

which is found to be an excellent agent for reserving wool against substantive dyestuffs.

Example 2.—344 parts by weight of benzidinem.m'-disulfonic acid are dissolved in about 30 times the weight of water with the addition of chalk; the mixture is stirred thoroughly at 85–95° C. in the presence of an excess of chalk or another acid fixing agent with 563 parts by weight of 2-chloro-1-toluene-4-sulfochloride (125% of the quantity theoretically required). The temperature of the reaction mixture is raised gradually to about 100° C. and maintained there for some hours; then the mixture is allowed to cool, and the precipitated reaction product is filtered by suction. The crude product is dissolved in a hot sodium carbonate solution, filtered, if necessary, neutralized with hydrochloric acid and precipitated by means of a sodium chloride solution. There is obtained in a satisfactory yield the sodium salt of the bis-(2-chloro-1-toluene-4-sulfonyl)-benzidine-m.m'-disulfonic acid of the formula:

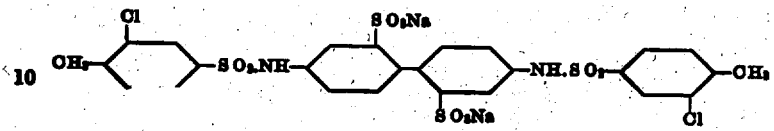

which is a satisfactory agent for reserving wool against substantive dyestuffs.

The 2-chloro-1-toluene-4-sulfochloride used in this example is obtained, for example, by introducing 2-chloro-1-toluene-4-sulfonic acid into about 5 times the quantity of sulfuric acid chlorhydrin and heating the resulting solution to 60–70° C. When the evolution of the hydrochloric acid has ceased the reaction mixture is then poured on to a freezing mixture, consisting of ice and sodium chloride, the precipitated 2-chloro-1-toluene-4-sulfonic chloride is filtered and, if necessary or desired, purified by dissolving in ether. It can be recovered from the dried ethereal solution by distilling off the ether.

*Example 3.*—344 parts by weight of benzidine-m.m'-disulfonic acid are dissolved in about 30 times the quantity of water with the addition of chalk and stirred thoroughly for a long time at temperatures between 85 and 95° C. in the presence of an excess of chalk or other acid fixing agents with 700 parts by weight of 1.2.3-trichlorobenzene-4-sulfochloride (125% of the theoretical amount). The reaction mixture is heated for half an hour to about 100° C., allowed to cool and the precipitate obtained its filtered off. It is dissolved in a hot aqueous sodium carbonate solution and after removing the excess chalk by filtration, precipitated by the addition of sodium chloride solution. There is obtained in an excellent yield the sodium salt of the bis-(1.2.3-trichlorobenzene-4-sulfonyl)-benzidine-m.m'-disulfonic acid:

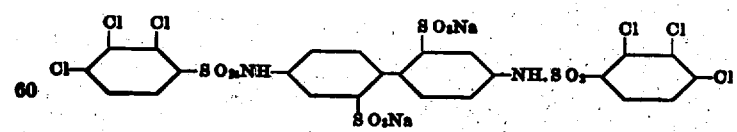

which is an excellent agent for reserving wool against substantive dyestuffs.

The 1.2.3-trichlorobenzene-4-sulfochloride used in this example is obtained by introducing 1.2.3-trichlorobenzene into 5 times its weight of chlorosulfonic acid and slowly heating the sulfonating mixture to about 60 to 70° C. After the evolution of hydrochloric acid has ceased and cooling, the mixture is poured on ice and the 1.2.3-trichlorobenzene-4-sulfochloride, separating out in a granular form, is filtered off. It can be obtained in a pure state, by dissolving the crude product in ether, drying the solution with dried calcium chloride, and distilling off the ether from the dry solution.

*Example 4.*—344 parts by weight of benzidine-m.m'-disulfonic acid are dissolved in hot water by means of a weak sodium carbonate solution and treated, while thoroughly stirring, in the presence of an excess of chalk or sodium acetate or other acid fixing agents at 85–95° C. with 640 parts by weight of 4-nitro-1-chlorobenzene-2-sulfochloride (125% of the theoretical amount). After heating for some hours longer to about 100° C. and allowing to cool the reaction product is filtered by suction. It is dissolved in sodium carbonate solution, filtered, neutralized with dilute sulfuric acid and reduced by means of iron with the addition of a little dilute sulfuric acid. When the reduction is complete the reduction mixture is rendered alkaline with sodium carbonate and the hot solution is filtered from the iron sludge. The solution is made acid by means of hydrochloric acid and again filtered while hot; the bis-(4-amino-1-chlorobenzene-2-sulfonyl)-benzidine-m.m'-disulfonic acid:

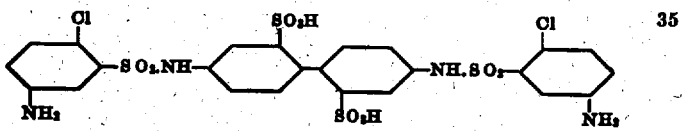

crystallizes out.

The corresponding tetrazotized compound is yellowish colored and difficultly soluble in cold water.

723 parts by weight of the bis-(4-amino-1-chlorobenzene-2-sulfonyl)-benzidine-disulfonic acid are dissolved by means of sodium carbonate solution. To the solution, heated to about 85° C., are added, while thoroughly stirring, 200 parts by weight of chalk and then 773 parts by weight of 1.2-dichlorobenzene-4-sulfochloride (150% of the theoretically necessary quantity); then the mixture is slowly heated to 95° C. After a short time the reaction product begins to separate in the form of a crust while the solution becomes clear. The temperature is then raised to about 100° C., and after cooling and filtering the pulverized residue is made into a paste by means of dilute hydrochloric acid; the crude product is then separated by filtration from the acid liquor, containing calcium chloride. The reaction product is dissolved by means of sodium carbonate solution and precipitated with a little hydrochloric acid, while maintaining the solution still alkaline. If necessary or desired, it can

be purified by redissolving from water. It possesses the constitution:

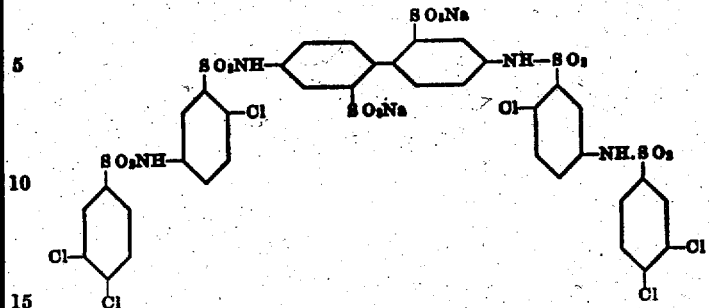

and protects wool excellently against dyeing with substantive dyestuffs.

The 1.2-dichlorobenzene-4-sulfochloride used in this example is obtained by introducing 1.2-dichlorobenzene or 1.2-dichlorobenzene-4-sulfonic acid into about 5 times the quantity of chlorosulfonic acid and heating the solution to 60-70° C. The reaction mixture is advantageously poured on to a freezing mixture, consisting of sodium chloride and ice and the 1.2-dichlorobenzene-4-sulfochloride is filtered off; if necessary or desired, it can be purified by dissolving in ether, from which it can be recovered by distilling off the ether after drying the ethereal solution with calcium chloride.

*Example 5.*—344 parts by weight of benzidine-m.m'-disulfonic acid are dissolved by heating in 10 to 15 times the quantity of water with the addition of 100 parts by weight of chalk. To this solution are added while stirring 150 parts by weight of chalk and at about 75° C. 532 parts by weight of meta-nitro-benzene-sulfochloride (120% of the theoretical amount). This reaction mixture is kept at 75-80° C. for some time and then it is boiled for half an hour. The mixture is rendered weakly Congo acid with dilute hydrochloric acid and then the mass is stirred whilst cooling. The bis-(3-nitrobenzene-1-sulfonyl)-benzidine-m.m'-disulfonic acid in the form of its calcium salt separates in a granular form and may be filtered off from the liquid by suction. It is redissolved in 8 to 10 times the quantity of hot water and reduced by the addition of 50 parts by volume of crude hydrochloric acid and 1000 parts by weight of iron powder, at a temperature of about 95-100° C. maintained for several hours. When the reduction is complete this hot mixture is rendered strongly alkaline by the addition of 525 parts by volume of caustic soda solution (38° Bé.). The solution is then filtered off from the iron residue and introduced into an excess of cold dilute hydrochloric acid. The bis-(3-amino-benzene-sulfonyl)-benzidine-m.m'-disulfonic acid of the formula:

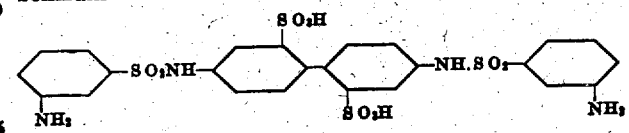

is precipitated. It is isolated in the usual manner by filtering off and dried. In this form it is a white powder soluble in hot water with a mineral acid reaction to Congo paper. It forms a yellowish colored tetrazo compound when tetrazotized, difficultly soluble in cold water.

A quantity of this compound corresponding to one gram molecule is dissolved by the addition of 100 parts by weight of chalk in about 7 times the quantity of hot water. Into the well stirred solution are introduced 400 parts by weight of chalk and at a temperature of 85-90° C. 638 parts by weight of 1.2-dichlorobenzene-4-sulfochloride (130% of the theoretical amount). The reaction begins after a short time and the condensation product separates first in an oily and finally in a stable form. The temperature is kept for some time at 90-95° C. and then the mixture is boiled for half an hour. After cooling the solution is removed from the stable precipitate which is treated with dilute hydrochloric acid at a temperature of 60-70° C. The acid solution containing calcium chloride is filtered off and the residue is dissolved in ten times the quantity of hot water with the addition of sodium carbonate. The calcium carbonate which precipitates is filtered off and the solution thus obtained is acidified with dilute acetic acid. After cooling the solution the bis-(1.2-dichlorobenzene-4-sulfonyl-3'-aminobenzene-1'-sulfonyl)-benzidine-disulfonic acid separates in the form of its sodium salt of the formula:

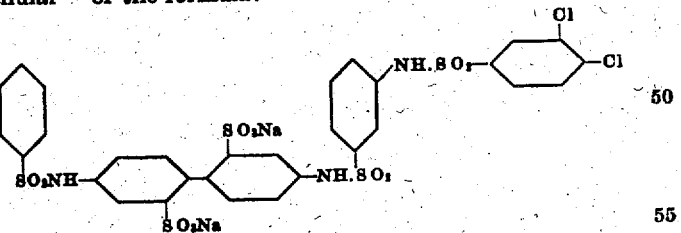

in a viscous and then in a granular form and may be isolated by filtering off. The dried product is a white powder easily soluble in warm water and being precipitated by common salt or acids. When this substance is added to a dyeing-bath in which half wool or half silk is intended to be dyed with a substantive dyestuff, it reserves the wool or the silk to a high degree from becoming dyed.

The 1.2-dichlorobenzene-4-sulfochloride used in the preceding Examples 4 and 5 for the preparation of the condensation products containing systems of 6 nuclei can also be replaced by other substituted or unsubstituted arylsulfochlorides. For instance, the sodium salt of bis-(naphthalene-1-sulfonyl-3'-aminobenzene-1'-sulfonyl)-benzidine-m.m'-disulfonic acid of the formula:

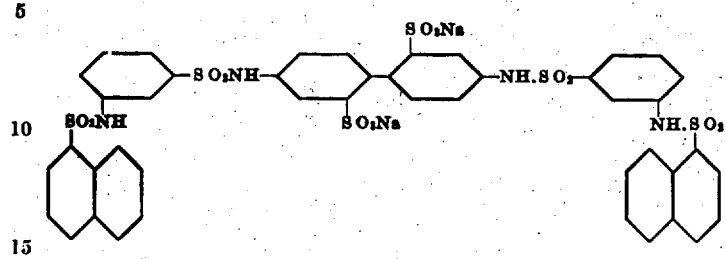

and the sodium salt of the bis-(naphthalene-2-sulfonyl-3'-aminobenzene-1'-sulfonyl)-benzidine-m.m'-disulfonic acid of the formula:

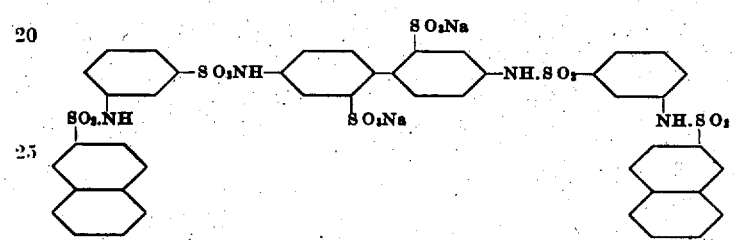

are also valuable reserving agents for wool or silk against substantive dyestuffs. These compounds may be prepared by combining bis-(3-aminobenzene-1-sulfonyl)-benzidine-m.m'-disulfonic acid with naphthalene-1-sulfochloride or naphthalene-2-sulfochloride, respectively.

Furthermore, the sulfonimido groups can be replaced by carbonimido groups. Such compounds are, for instance, the bis-(benzoyl-3'-aminobenzene-1'-sulfonyl)benzidine-m.m'-disulfonic acid which corresponds in the form of its sodium salt to the following probable formula:

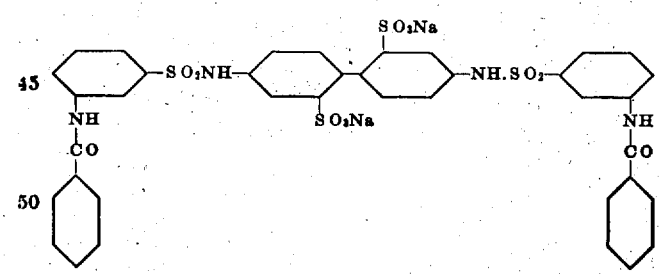

or the bis-(1.2-dichlorobenzene-4-sulfonyl-3'-aminobenzoyl)-benzidine-m.m'-disulfonic acid which corresponds in the form of its sodium salt to the probable formula:

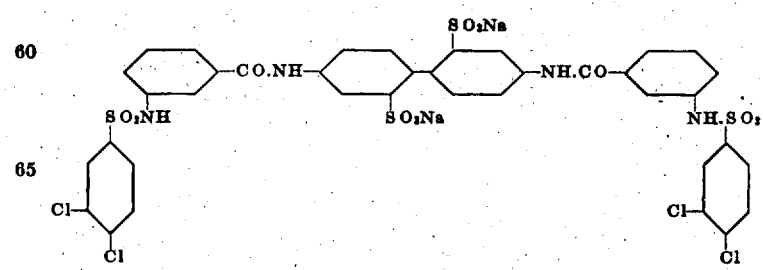

Both these compounds may be produced by combining two molecules of benzoylchloride with one molecule of bis-(3-aminobenzene-1-sulfonyl)-benzidine-m.m'-disulfonic acid respectively by combining two molecules of 1.2-dichloro-benzene-4-sulfochloride with one molecule of bis-(3-amino-benzoyl)-benzidine-m.m'-disulfonic acid. These products are likewise valuable reserving agents for wool or silk against substantive dyestuffs.

*Example 6.*—The quantity corresponding to one gram molecule of bis-(3-aminobenzene-1-sulfonyl)-benzidine-m.m'-disulfonic acid in the form of its sodium salt is dissolved in about 10 times the quantity of hot water with the addition of 100 parts by weight of chalk. Into the well stirred solution are introduced 400 parts by weight of chalk and at 80–85° C. 554 parts by weight of meta-nitrobenzene-sulfochloride (125% of the theoretical amount). It is heated at 90° C. for some time and boiled for half an hour. After cooling the solution is filtered off from the residue and the latter is treated with dilute hydrochloric acid at 60–70° C. The acid solution containing calcium chloride is removed and the brown colored residue is dissolved in 20 times the quantity of hot water. Into this solution heated to 90° C. are introduced 200 parts by volume of hydrochloric acid and 1000 parts by weight of iron powder, and the reduction mixture is kept boiling for 2 to 3 hours. The reduction solution is then rendered strongly alkaline with 600 parts by volume of caustic soda lye (38° Bé.) and the solution is filtered off from the iron residue. After cooling the bis-(3-aminobenzene-1-sulfonyl-3'- aminobenzine-1'-sulfonyl)-benzidine - m.m' - disulfonic acid of the formula:

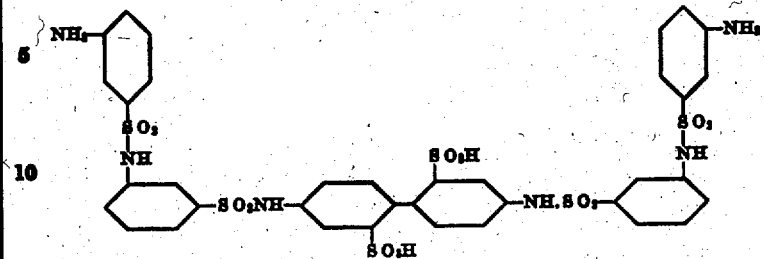

separates from the solution on acidying it with crude hydrochloric acid. This compound is a white powder soluble in hot water; the tetrazotized compound is yellowish colored and difficultly soluble in cold water.

The quantity corresponding to one gram molecule of bis-(3-aminobenzene-1-sulfonyl-3'-aminobenzene-1'-sulfonyl)-benzidine - m.m' - disulfonic acid is then dissolved in about 15 times the quantity of hot water with the addition of 220 parts by weight of chalk. Into the well stirred solution are introduced 400 parts by weight of chalk, and afterwards at 85-95° C. 638 parts by weight of 1.2-dichlorobenzene-4-sulfochloride. After the reaction is completed the mixture is boiled for about half an hour. After cooling the solution is filtered off from the residue representing a compact mass and the latter is treated with an excess of dilute hydrochloric acid at 60-70° C. The acid solution containing calcium chloride is removed and the condensation product is dissolved while heating in an aqueous solution of sodium carbonate. The solution removed by filtration from the precipitated calcium carbonate is then rendered strong acid by the addition of dilute acetic acid. The sodium salt of bis-1.2-dichlorobenzene-4-sulfonyl - 3'- aminobenzene - 1'- sulfonyl -3''-aminobenzene - 1''- sulfonyl)-benzidine-m.m'-disulfonic acid corresponding to the formula:

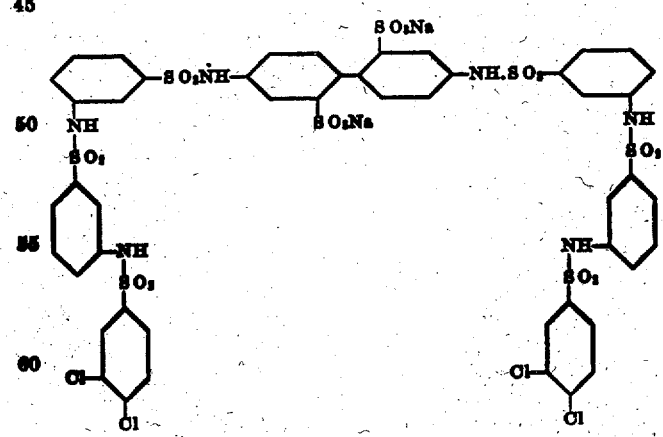

is almost quantitatively precipitated from the solution and can be isolated by filtering off from the cooled aqueous solution. The new product easily soluble in warm water is able in a high degree to reserve wool or silk in mixed textile fabrics from becoming dyed by substantive dyestuffs. In the Examples 2-6 the starting material, the benzidine-m.m'-disulfonic acid, can be replaced for example by tolidine-m.m'-disulfonic acid or by diaminostilbene-m.m'-disulfonic acid or by diaminodiaryl derivatives having other bridge bonds between the two aryl nuclei. In an analogous manner diaminobenzene derivatives such as 2.6-toluylenediamine-4-sulfonic acid or 2.4-toluylenediamine-6-sulfonic acid and so on may be used as starting materials instead of the above mentioned diaminodiphenyl derivatives. The condensation products thus obtained likewise possess the properties of reserving wool or silk from becoming dyed by substantive dyestuffs.

Example 7.—318 parts by weight of 1.5-naphthylenediamine-3.7-disulfonic acid are dissolved in about 15 times the quantity of water with the addition of 160 parts by weight of sodium carbonate. While heating after the addition of about 250 parts by weight of chalk 886 parts by weight of 3-nitrobenzene-sulfochloride (200% of the theoretical amount) are introduced at 85° C. into the solution. While well stirring this solution is kept for some time at 85-95° C., and then it is further boiled for about half an hour. When cooling the solution is rendered Congo acid by the addition of hydrochloric acid and the condensation product thus obtained is further precipitated by an addition of common salt. It is filtered off, washed with dilute hydrochloric acid and reduced at boiling temperature with a calculated quantity of a concentrated solution of stannous chloride in hydrochloric acid. The bis-(3-aminobenzene-1-sulfonyl(-1'.5'-naphthylene-3'.7'-disulfonic acid is separated after cooling. This compound is redissolved in a sodium carbonate solution and precipitated from the filtered solution by the addition of acetic acid. The quantity corresponding to one gram molecule of this compound is dissolved in about 10 times the quantity of hot water with the addition of 100 parts by weight of chalk. Into the well stirred solution are introduced at 85-95° C. 459 parts by weight of benzene sulfochloride (130% of the theoretical amount). When the reaction is finished, it is boiled for about half an hour, while well stirring, then it is cooled and the solution is filtered off from the reaction product remaining in form of a compact mass. To this mass a hot solution of sodium carbonate is added, the resulting lye is filtered to remove the calcium carbonate, and the condensation product is precipitated by the addition of acetic acid. Thus the sodium salt of the bis-(benzenesulfonyl-3'-aminobenzene-1'-sulfonyl)-1".5"-naphthylenediamine-3".7"-disulfonic acid of the formula:

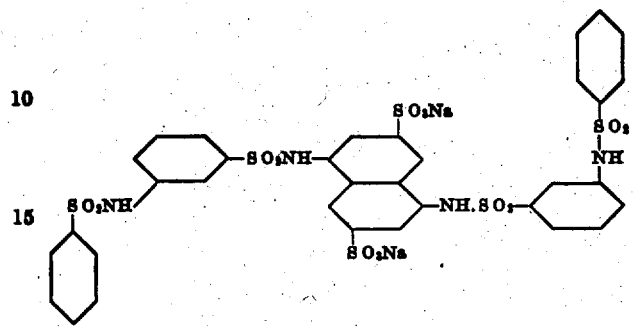

is obtained firstly in a viscous and then after cooling in a crystalline form. When dried it represents a white powder, easily soluble in hot water, which partly precipitates, when the solution is cooled.

It is capable to a high degree of reserving wool or silk against substantive dyestuffs.

We claim:

1. Substituted arylacidylamino compounds selected from the class consisting of

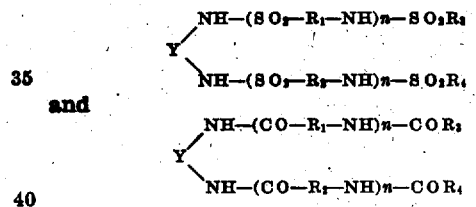

wherein Y stands for an aromatic radical of the group consisting of phenylene, naphthylene, diphenylene and compounds in which two benzene nuclei are linked together by means of a bridge, each benzene nucleus being substituted by a sulfonic acid group, $R_1$ and $R_2$ stand for a benzene nucleus having the acylamino groups in meta-position to each other and $R_3$ and $R_4$ stand for nuclei of the group consisting of benzene and naphthalene nuclei $n$ being a number of the group consisting of 0, 1, and 2, said compounds being colorless or nearly colorless powders, soluble in water, and being valuable reserving agents for wool or silk against substantive dyestuffs.

2. Substituted arylacidylamino compounds selected from the class consisting of

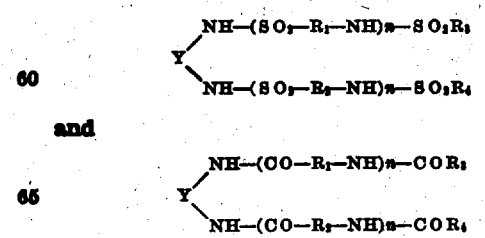

in which Y denotes an aromatic radical in which two benzene nuclei are linked together by means of a bridge, each nucleus being substituted by a sulfonic acid group, $R_1$ and $R_2$ denote a benzene nucleus having the acylamino groups attached to it in meta-position to each other and $R_3$ and $R_4$ denote nuclei of the group consisting of benzene and naphthalene nuclei $n$ being a number of the group consisting of 0, 1, and 2, said compounds being colorless or nearly colorless powders, soluble in water, and being valuable reserving agents for wool or silk against substantive dyestuffs.

3. Substituted arylacidylamino compounds selected from the class consisting of

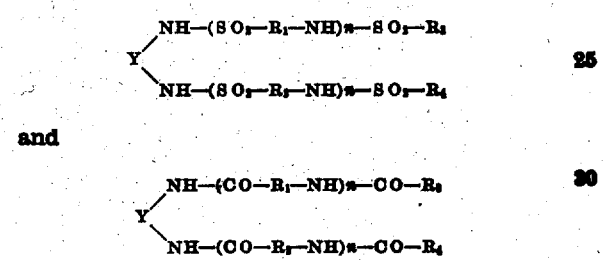

in which Y denotes a diphenylene nucleus each benzene nucleus thereof being substituted by a sulfonic acid group, $R_1$ and $R_2$ denote a benzene nucleus having the acylamino groups attached to it in meta-position to each other and $R_3$ and $R_4$ denote nuclei of the group consisting of benzene and naphthalene nuclei, $n$ being a number of the group consisting of 0, 1, and 2, said compounds being colorless or nearly colorless powders, soluble in water, and being valuable reserving agents for wool or silk against substantive dyestuffs.

4. A condensation product having the formula:

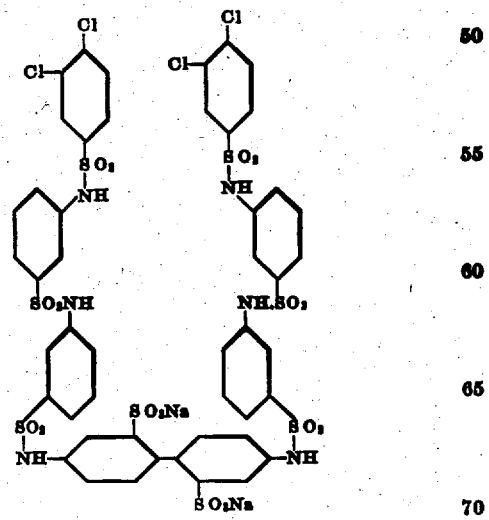

that product being a colorless powder, easily soluble in water and being a valuable reserving agent for wool or silk against substantive dyestuffs.

5. Condensation products of the general formula:

$$NH-(SO_2-R_1-NH)_n-SO_2-R_3$$
$$Y$$
$$NH-(SO_2-R_2-NH)_n-SO_2-R_4$$

in which Y denotes an aromatic radical of the group consisting of di-phenylene and compounds in which two benzene nuclei are linked together by means of a bridge, each nucleus being substituted by a sulfonic acid group, $R_1$ and $R_2$ denote a benzene nucleus having the $SO_2$ and NH groups attached to it in meta-position to each other and $R_3$ and $R_4$ denote nuclei of the group consisting of benzene and naphthalene nuclei, said nuclei $R_3$ and $R_4$ being substituted by chlorine, $n$ being 0, 1 or 2; said condensation products being colorless or nearly colorless powders, soluble in water, and being valuable reserving agents for wool or silk against substantive dyestuffs.

6. The products defined in claim 5 wherein a chlorine atom is in meta-position to the sulfonic amide group.

7. Condensation products of the general formula:

$$NH-(SO_2-R_1-NH)_n-SO_2-R_3$$
$$Y$$
$$NH-(SO_2-R_2-NH)_n-SO_2-R_4$$

in which Y denotes an aromatic radical of the group consisting of di-phenylene and compounds in which two benzene nuclei are linked together by means of a bridge, each nucleus being substituted by a sulfonic acid group, $R_1$ and $R_2$ are benzene nuclei having the $SO_2$ and NH-groups attached to them in meta position to each other, and $R_3$ and $R_4$ are benzene nuclei substituted at least in meta position to the amide group by chlorine, $n$ being a number of the group consisting of 0, 1 and 2, said condensation products being colorless or nearly colorless powders, soluble in water, and being valuable reserving agents for wool or silk against substantive dyestuffs.

JOHANN HUISMANN.
HUGO SCHWEITZER.

CERTIFICATE OF CORRECTION.

Patent No. 2,070,207. February 9, 1937.

JOHANN HUISMANN, ET AL.

It is hereby certified that the above numbered patent was erroneously issued to "I. G. Farbenindustrie Aktiengesellschaft" whereas said patent should have been issued to General Aniline Works Inc., of New York, N. Y., as assignee by mesne assignments, as shown by the records of assignments in this office; and that the said Letters Patent should be read with this correction therein that the same may conform to the record of the case in the Patent Office.

Signed and sealed this 25th day of May, A. D. 1937.

(Seal)

Henry Van Arsdale
Acting Commissioner of Patents.

5. Condensation products of the general formula:

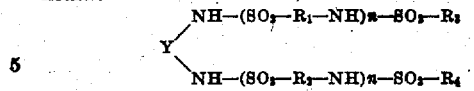

in which Y denotes an aromatic radical of the group consisting of di-phenylene and compounds in which two benzene nuclei are linked together by means of a bridge, each nucleus being substituted by a sulfonic acid group, $R_1$ and $R_2$ denote a benzene nucleus having the $SO_2$ and NH groups attached to it in meta-position to each other and $R_3$ and $R_4$ denote nuclei of the group consisting of benzene and naphthalene nuclei, said nuclei $R_3$ and $R_4$ being substituted by chlorine, $n$ being 0, 1 or 2; said condensation products being colorless or nearly colorless powders, soluble in water, and being valuable reserving agents for wool or silk against substantive dyestuffs.

6. The products defined in claim 5 wherein a chlorine atom is in meta-position to the sulfonic amide group.

7. Condensation products of the general formula:

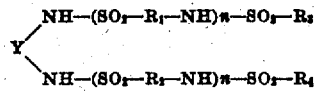

in which Y denotes an aromatic radical of the group consisting of di-phenylene and compounds in which two benzene nuclei are linked together by means of a bridge, each nucleus being substituted by a sulfonic acid group, $R_1$ and $R_2$ are benzene nuclei having the $SO_2$ and NH-groups attached to them in meta position to each other, and $R_3$ and $R_4$ are benzene nuclei substituted at least in meta position to the amide group by chlorine, $n$ being a number of the group consisting of 0, 1 and 2, said condensation products being colorless or nearly colorless powders, soluble in water, and being valuable reserving agents for wool or silk against substantive dyestuffs.

JOHANN HUISMANN.
HUGO SCHWEITZER.

CERTIFICATE OF CORRECTION.

Patent No. 2,070,207.      February 9, 1937.

JOHANN HUISMANN, ET AL.

It is hereby certified that the above numbered patent was erroneously issued to "I. G. Farbenindustrie Aktiengesellschaft" whereas said patent should have been issued to General Aniline Works Inc., of New York, N. Y., as assignee by mesne assignments, as shown by the records of assignments in this office; and that the said Letters Patent should be read with this correction therein that the same may conform to the record of the case in the Patent Office.

Signed and sealed this 25th day of May, A. D. 1937.

(Seal)

Henry Van Arsdale
Acting Commissioner of Patents.

CERTIFICATE OF CORRECTION.

Patent No. 2,070,207.                                              February 9, 1937.

JOHANN HUISMANN, ET AL.

It is hereby certified that the above numbered patent was erroneously issued to "I. G. Farbenindustrie Aktiengesellschaft" whereas said patent should have been issued to General Aniline Works Inc., of New York, N. Y., as assignee by mesne assignments, as shown by the records of assignments in this office; and that the said Letters Patent should be read with this correction therein that the same may conform to the record of the case in the Patent Office.

Signed and sealed this 25th day of May, A. D. 1937.

(Seal)

Henry Van Arsdale
Acting Commissioner of Patents.